United States Patent [19]

Bizlewicz

[11] Patent Number: 5,804,776
[45] Date of Patent: Sep. 8, 1998

[54] VIBRATORY ENERGY DISSIPATION

[76] Inventor: F. Peter Bizlewicz, 1209 Pines Lake Dr. West, Wayne, N.J. 07470

[21] Appl. No.: 861,794

[22] Filed: May 22, 1997

[51] Int. Cl.[6] .............................. F16F 15/00; F16M 3/00
[52] U.S. Cl. .......................................... 181/207; 248/638
[58] Field of Search ..................... 181/207, 208, 181/209, 199, 202; 248/559, 638

[56] References Cited

U.S. PATENT DOCUMENTS

| | | | |
|---|---|---|---|
| 4,493,471 | 1/1985 | McInnis | 181/208 |
| 5,197,707 | 3/1993 | Kohan | 248/638 |
| 5,681,023 | 10/1997 | Sheydayi | 248/638 |

*Primary Examiner*—Khanh Dang
*Attorney, Agent, or Firm*—Arthur Jacob

[57] ABSTRACT

A coupling device is interposed between a component of a sound reproduction system and a supporting structure for the draining, transmission and dissipation of vibratory energy generated within the component while isolating the component from vibratory energy emanating from the support structure.

15 Claims, 4 Drawing Sheets

VIBRATORY ENERGY DISSIPATION

The present invention relates generally to improving the performance of electronic and electro-acoustical equipment and pertains, more specifically, to the dissipation of unwanted vibratory energy ordinarily present in electronic and electro-acoustical components of sound reproduction systems so as to reduce or eliminate a source of distortion in the reproduced sound.

It has long been known that microphonic vibrations in electronic equipment used in the reproduction of sound impairs the performance of such equipment by the introduction of distortion. It has been found that unwanted vibratory energy is introduced not only from external sources, but is generated internally, within the electronic equipment itself. Thus, unwanted vibratory energy is generated within amplifiers, preamplifiers, CD players and the like, and even in loudspeakers, not only through internal power transformers but by other internal circuitry as well.

In efforts to reduce or eliminate the deleterious effects of external vibrations, isolation platforms and isolation feet have been provided for use in connection with electronic equipment in sound reproduction systems. However, these measures are aimed at isolating electronic and electro-acoustical components from external vibrations and are not designed to deal with vibrational energy which originates within the components themselves. Thus, while isolation platforms and various resilient feet may be effective in decoupling electronic and electro-acoustical equipment from surrounding external sources of vibration, such devices are not directed to the treatment of vibratory energy generated within the equipment itself. In fact, such isolation devices can exacerbate the effects of internal vibratory energy by reflecting such energy back into the component and thereby increasing the deleterious effects of internal vibrations.

In an effort to reduce or eliminate the deleterious effects of internal vibratory energy generated within electronic and electro-acoustical equipment in sound systems, devices have been introduced for dissipating vibrations which emanate from the equipment. Thus, energy absorption platforms, sold under the trademark SYMPOSIUM, are available for placement between electronic components and surrounding support structures to absorb and dissipate vibratory energy generated within the components themselves. These energy absorption platforms have demonstrated an ability to reduce or eliminate unwanted vibration with a concomitant reduction in distortion and other deleterious effects for audible improvements in sound reproduction.

The present invention provides further improvements in the dissipation of deleterious vibratory energy emanating from electronic and electro-acoustical components for increased levels of performance in sound reproduction systems. As such, the present invention attains several objects and advantages, some of which are summarized as follows: Effectively dissipates deleterious vibratory energy generated within electronic and electro-acoustical equipment for enhanced performance of such equipment in sound reproduction systems; enhances the drain of internally generated vibratory energy from electronic and electro-acoustical components for dissipation to surrounding vibration absorbing structures; provides a simple and effective arrangement for reducing or eliminating the deleterious effects of internally generated vibratory energy in electronic and electro-acoustical components; enables enhanced performance in sound reproduction systems without requiring modifications in the electronic and electro-acoustical components of the systems; is compatible for use with a wide variety of currently available electronic and electro-acoustical equipment; provides a relatively simple construction capable of relatively economical manufacture and widespread use for effective and reliable performance throughout a long service life.

The above objects and advantages, as well as further objects and advantages, are attained by the present invention which may be described briefly as a coupling device for interposition between a component of a sound reproduction system and a supporting structure for the transmission and dissipation of vibratory energy generated within the component while isolating the component from vibratory energy emanating from the support structure, the coupling device comprising: a block having a perimeter, an upper surface and a lower surface; a basal portion located along the lower surface of the block; a matrix at the basal portion, the matrix providing a contact area along the basal portion, the contact area being less than the area of the lower surface; a depression in the upper surface; and a rolling member in the depression for placement between the component and the block to transmit vibratory energy from the component to the block for dissipation at the lower surface of the block, while isolating the component from vibratory energy emanating from the support structure.

The invention will be understood more fully, while still further objects and advantages will become apparent, in the following detailed description of preferred embodiments of the invention illustrated in the accompanying drawing, in which.

Figure 1:
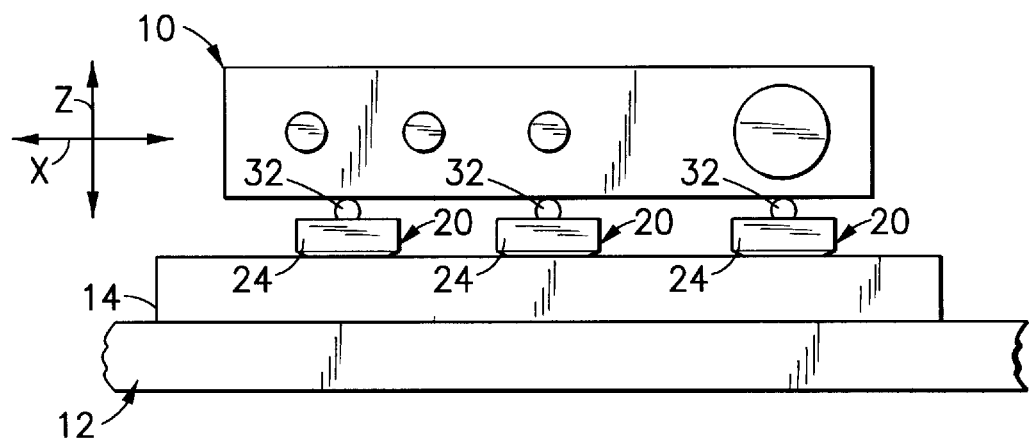
FIGS. 1 and 2 are diagrammatic views illustrating the use of devices constructed in accordance with the present invention.
Figure 2:
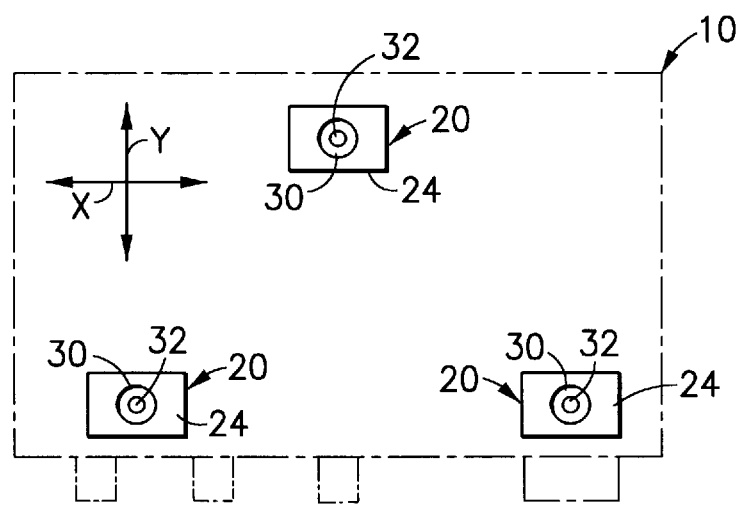
Figure 3:
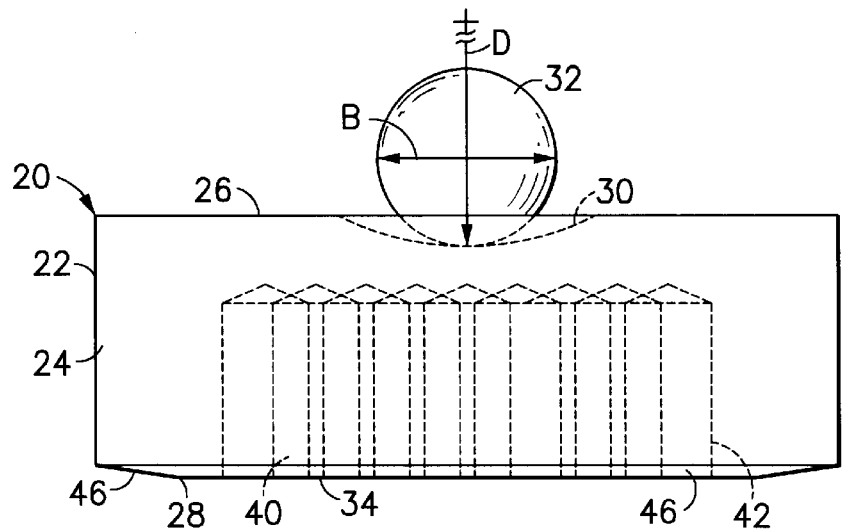
FIG. 3 is an enlarged front elevational view of a device constructed in accordance with the present invention.
Figure 4:
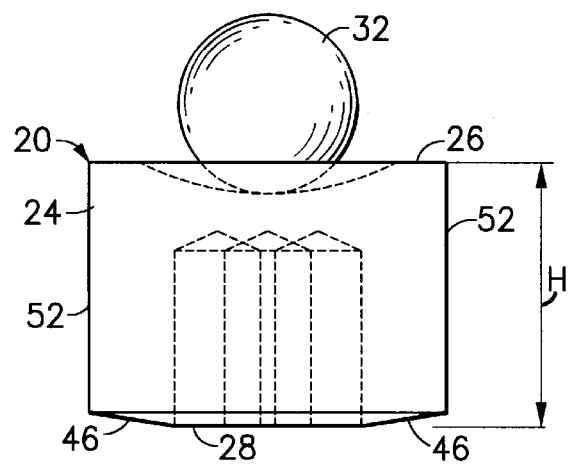
FIG. 4 is an end elevational view of the device.
Figure 5:
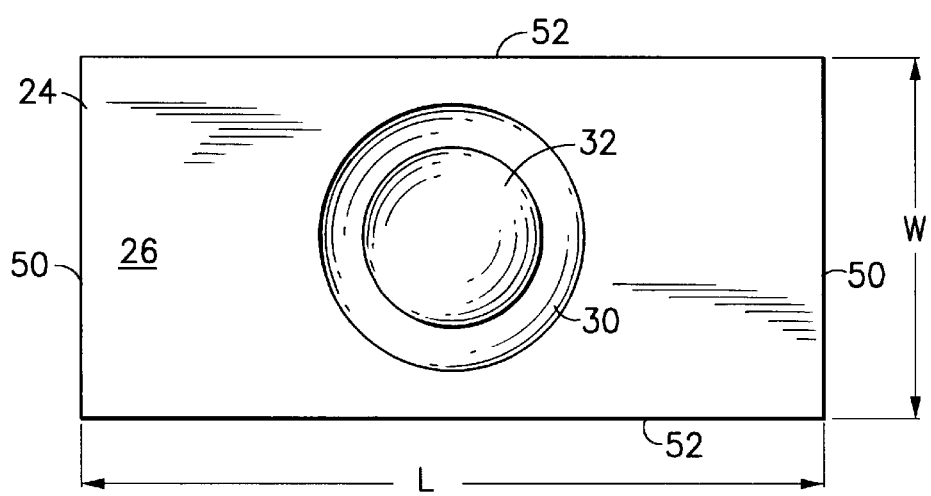
FIG. 5 is a top plan view of the device.
Figure 6:
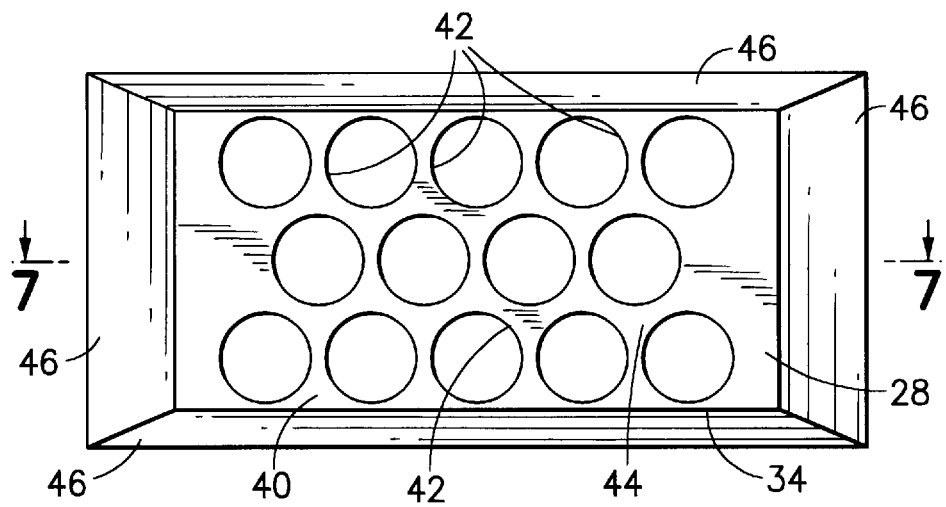
FIG. 6 is a bottom plan view of the device.
Figure 7:
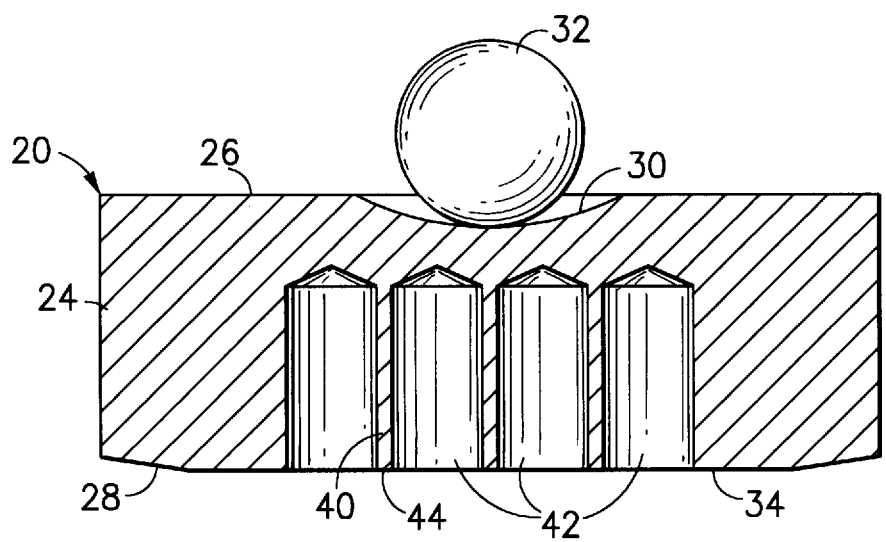
FIG. 7 is a cross-sectional view taken along line 7—7 of FIG. 6.

Referring now to the drawing, and especially to FIGS. 1 and 2 thereof, an electronic component of a sound reproduction system is shown diagrammatically in the form of an amplifier 10 supported upon a supporting structure which includes a support shelf 12. An energy absorption platform 14 is interposed between the amplifier 10 and the shelf 12 for absorbing vibrational energy emanating from the amplifier 10 in a now known manner. One such energy absorption platform 14 currently is available under the trademark SYMPOSIUM and has demonstrated the ability to enhance the performance of the amplifier 10 through exhibiting improved dynamic range and reduced intermodulation distortion in the sound reproduction system. In order to more effectively couple the amplifier 10 with the energy absorption platform 14 for draining and dissipating vibrational energy generated within the amplifier 10, three coupling devices constructed in accordance with the present invention are shown at 20, interposed between the amplifier 10 and the platform 14 and located at the apices of a triangle.

As best seen in FIGS. 3 through 7, as well as in FIGS. 1 and 2, each coupling device 20 has a base 22 which includes a block 24 having an upper surface 26 and a lower surface 28. A depression 30 in the upper surface 26 receives a rolling member shown in the form of a ball 32 upon which the amplifier 10 is to rest, as seen in FIG. 1. The lower surface 28 includes a basal portion 34 which is to contact the platform 14, as seen in FIG. 1.

Depression 30 has a semi-spherical surface contour configuration which includes a diameter D considerably larger than the diameter B of ball 32. Vibratory energy emanating from amplifier 10 and directed in altitudinal, or vertical directions, as illustrated by arrows Z in FIG. 1, is transmitted through ball 32 to block 24 to follow an altitudinal path to the platform 14 where the vibratory energy is dissipated. Vibratory energy emanating from amplifier 10 and directed in lateral, or horizontal directions, as illustrated by arrows X and Y in FIGS. 1 and 2, will tend to move the ball 32 along the depression 30, with a concomitant change in the altitude of the ball 32, thereby draining at least some of the laterally directed vibratory energy in an altitudinal direction into the platform 14. At the same time, the ball 32 and depression 30 arrangement tends to isolate amplifier 10 from any external vibratory energy which may emanate from the shelf 12.

In order to increase the effectiveness of the conduct of the vibratory energy from the amplifier 10 through the block 24 to the platform 14, the block 24 is provided with a matrix 40, preferably established by plurality recesses shown in the form of bores 42 extending from the basal portion 34 of the lower surface 28 altitudinally upwardly into the block 24. The matrix 40 more effectively conducts the vibratory energy drained from amplifier 10 through the block 24 by optimizing the transmission path of the vibratory energy through the block 24 and more effectively couples the block 24 with the platform 14 for transmission of the vibratory energy from the block 24 to the platform 14. To that end, the configuration of the matrix 40 at the basal portion 34 of the lower surface 28 provides a contact area 44 along the basal portion 34 which is reduced in area as compared to the overall plan configuration of the block 24 and which is spread over the area of the lower surface 28. The area of the basal portion 34, and the contact area 44, is reduced further by the provision of bevelled portions 46, the bevelled portions 46 preferably extending completely around the perimeter of the basal portion 34 to surround the basal portion 34.

In the preferred construction, the diameters of the bores 42 and the extent of the bevelled portions 46 are chosen so that the contact area 44 is no more than about twenty-five percent of the area of the lower surface 28 in the overall plan configuration of the block 24. The bores 42 preferably extend into the block 24 along approximately just over one-half the height of the block 24. Both the block 24 and the ball 32 are constructed of metal, the preferred metal for block 24 being aluminum and the preferred metal for ball 32 being steel. Block 24 preferably has an overall parallelepipedic configuration including a longitudinal length L between opposite parallel ends 50, a lateral width W between opposite parallel sides 52, and an altitudinal height H between the upper surface 26 and the lower surface 28. In a typical device 20, length L is about two inches, width W is about one inch and height H is about three-quarters of an inch, while the diameter B of ball 32 is about three-eighths of an inch, the diameter D of depression 30 is about one and one-quarter inches, and the bores 42 have a diameter of about one-quarter of an inch, are spaced apart longitudinally just over one-quarter of an inch, are spaced apart laterally just under one-quarter of an inch and extend into block 24 over a length of just under one-half an inch.

Figure 8:
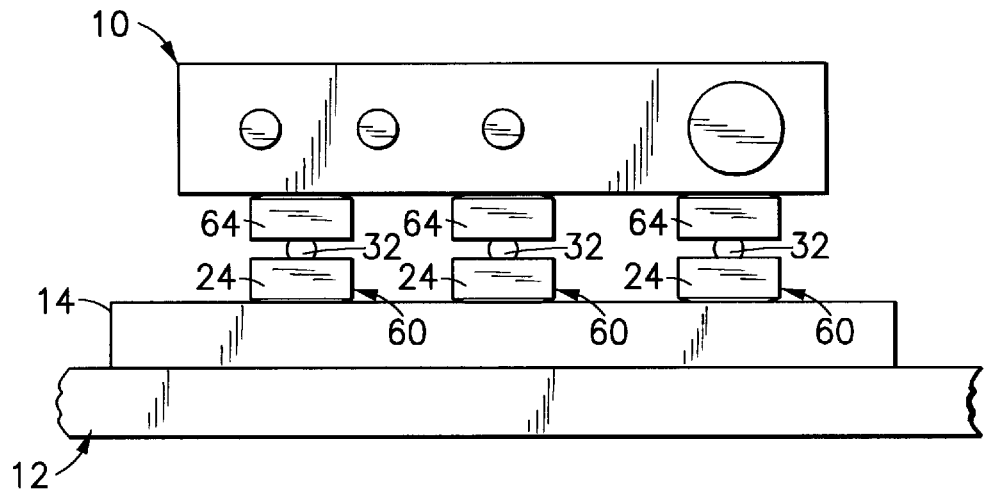
FIG. 8 is a diagrammatic view similar to FIG. 1 and showing an alternate embodiment.
Figure 9:
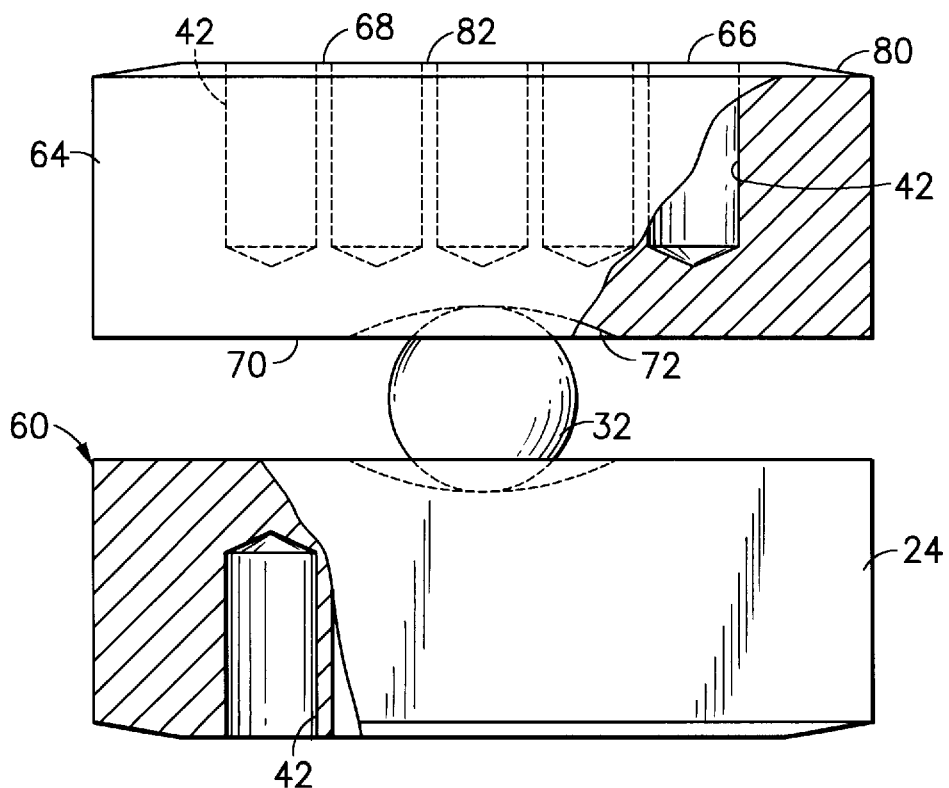
FIG. 9 is an enlarged front elevational view similar to FIG. 3 and showing the alternate embodiment.

Referring now to FIGS. 8 and 9, an alternate embodiment is illustrated in the form of coupling device 60, three of which devices 60 are shown in FIG. 8 coupling amplifier 10 with energy absorption platform 14 located on shelf 12. Coupling device 60 employs the same block 24 and ball 32 as is described in connection with coupling device 20 above. However, in coupling device 60, a further, second block 64 is interposed between amplifier 10 and ball 32, with the further block 64 having the same structure as first block 24, but being inverted relative to the orientation of the first block 24, located between the ball 32 and the platform 14. With the inversion of the second block 64, the upper surface 66 of the second block 64 includes a coupling portion 68, corresponding to basal portion 34 of the first block 24, while the lower surface 70 of the second block 64 includes a depression 72 corresponding to depression 30 of the first block 24.

A matrix 80 in the second block 64 extends from the coupling portion 68 at the upper surface 66 toward the lower surface 70. As before, matrix 80 provides a contact area 82 of reduced area, along the coupling portion 68, and is comprised of a plurality of recesses in the form of bores 42. In this manner, even more effective coupling is attained between amplifier 10 and platform 14, for draining and transmitting vibratory energy emanating from the amplifier 10 so as to be dissipated at platform 14, while isolating amplifier 10 from any external vibratory energy emanating from the shelf 12.

It will be seen that the present invention attains the objects and advantages summarized above, namely: Effectively dissipates deleterious vibratory energy generated within electronic and electro-acoustical equipment for enhanced performance of such equipment in sound reproduction systems; enhances the drain of internally generated vibratory energy from electronic and electro-acoustical components for dissipation to surrounding vibration absorbing structures; provides a simple and effective arrangement for reducing or eliminating the deleterious effects of internally generated vibratory energy in electronic and electro-acoustical components; enables enhanced performance in sound reproduction systems without requiring modifications in the electronic and electro-acoustical components of the systems; is compatible for use with a wide variety of currently available electronic and electro-acoustical equipment; provides a relatively simple construction capable of relatively economical manufacture and widespread use for effective and reliable performance throughout a long service life.

It is to be understood that the above detailed description of preferred embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A coupling device for interposition between a component of a sound reproduction system and a supporting structure for the transmission and dissipation of vibratory energy generated within the component while isolating the component from vibratory energy emanating from the support structure, the coupling device comprising:

a block having a perimeter, an upper surface and a lower surface;

a basal portion located along the lower surface of the block;

a matrix at the basal portion, the matrix providing a contact area along the basal portion, the contact area being less than the area of the lower surface;

a depression in the upper surface; and a rolling member in the depression for placement between the component and the block to transmit vibratory energy from the component to the block for dissipation at the lower surface of the block, while isolating the component from vibratory energy emanating from the support structure.

2. The invention of claim 1 wherein the matrix includes a plurality of recesses extending into the block from the lower surface toward the upper surface.

3. The invention of claim 2 wherein the recesses comprise bores extending into the block a distance of approximately just over one-half the distance between the upper surface and the lower surface of the block.

4. The invention of claim 1 wherein the contact area is no more than about twenty-five percent of the area of the lower surface of the block.

5. The invention of claim 4 including bevelled areas along the lower surface of the block between the contact area and the perimeter of the block.

6. The invention of claim 5 wherein the bevelled areas surround the contact area.

7. The invention of claim 1 wherein the depression has a semi-spherical surface contour configuration and the rolling member comprises a ball.

8. The invention of claim 1 including:

a further block having a perimeter, an upper surface and a lower surface;

a coupling portion located along the upper surface for engaging the component; and a further depression in the lower surface engaging the rolling member.

9. The invention of claim 8 including a further matrix at the coupling portion, the further matrix providing a further contact area along the coupling portion, the further contact area being less than the area of the upper surface of the further block.

10. The invention of claim 9 wherein the further matrix includes a plurality of further recesses extending into the further block from the upper surface toward the lower surface of the further block.

11. The invention of claim 10 wherein the further recesses comprise further bores extending into the further block a distance of approximately just over one-half the distance between the upper surface and the lower surface of the further block.

12. The invention of claim 9 wherein the further contact area is no more than about twenty-five percent of the area of the upper surface of the further block.

13. The invention of claim 12 including further bevelled areas along the upper surface of the further block between the further contact area and the perimeter of the further block.

14. The invention of claim 13 wherein the further bevelled areas surround the further contact area.

15. The invention of claim 9 wherein the further depression has a semi-spherical surface contour configuration.

* * * * *